United States Patent [19]
Gianessi

[11] 3,874,624
[45] Apr. 1, 1975

[54] CONNECTOR ASSEMBLY
[75] Inventor: Albert Gianessi, East Peoria, Ill.
[73] Assignee: Caterpiller Tractor Co., Peoria, Ill.
[22] Filed: Nov. 19, 1973
[21] Appl. No.: 416,731

[52] U.S. Cl................ 248/200, 151/41.7, 180/69.1
[51] Int. Cl......................... B60k 5/00, F16m 5/00
[58] Field of Search................... 248/200; 180/69.1; 296/28 F, 35 R, 35 A; 285/410, 367; 151/41.7

[56] References Cited
UNITED STATES PATENTS

| | | | |
|---|---|---|---|
| 1,447,161 | 2/1923 | Walton | 296/35 R |
| 2,688,170 | 9/1954 | Balzer | 285/410 X |
| 2,895,197 | 7/1959 | Agne et al. | 285/367 X |
| 3,367,383 | 2/1968 | Neuschotz | 151/41.7 |
| 3,464,722 | 9/1969 | Larkin | 285/367 |

FOREIGN PATENTS OR APPLICATIONS
854,629   11/1960   United Kingdom................ 285/367

*Primary Examiner*—J. Franklin Foss
*Attorney, Agent, or Firm*—Caterpillar Tractor Co.

[57] ABSTRACT

A connector for releasably joining a pair of interfitting elements, such as a belly-type engine guard to a vehicle main frame, including a retainer member extendible through the belly guard, and a fastener member operative to receive the retainer member in securing relation. The fastener member is loosely retainably mounted on the main frame for limited movement in substantially self-aligning relation to the retainer member to permit its substantially unrestricted securing receipt in the fastener member to accommodate minor misalignment between such interfitting elements.

6 Claims, 4 Drawing Figures

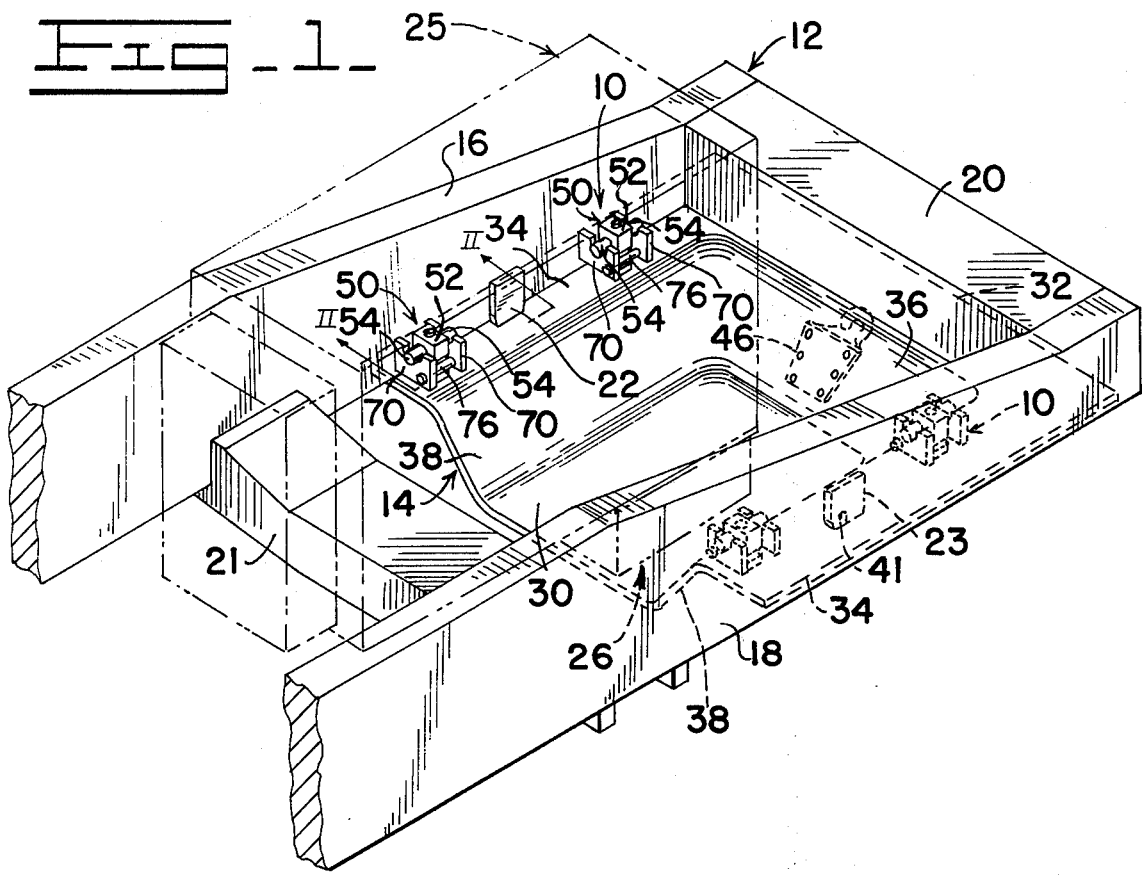

CONNECTOR ASSEMBLY

BACKGROUND OF THE INVENTION

Relatively large housings, such as those employed on heavy earthmoving vehicles, have in the past been difficult to install particularly in view of the problems encountered in providing acceptably close registry of the fastener openings in the housing with their associated fastener receiving locations on the supporting vehicle frames. It is common practice to secure a plurality of internally threaded weld nuts or tapping strips to the frame as by welding or the like and to extend threaded bolts through suitable openings in the housing for threading into such weld nuts or strips. These large vehicle frames and removable housings are normally fabricated and/or formed having a considerable tolerance range because of their size and difficulty in precisely fabricating and machining them which greatly aggravates the alignment problem. Corrosion and rusting of the threads and wear or other damage to the bolt heads often require that the bolts be burned off for service removal of the housings. When this occurs, it is necessary to rework the internally threaded nuts or tapping strips after such destructive removal of the bolts and their replacement effected by welding in order to permit the reinstallation of the housings. It will be apparent to those skilled in the art that such procedures are tedious, time-consuming and expensive both during initial assembly and during their replacement after subsequent servicing of any internal vehicle components covered by the housings.

Examples of prior art attempts to overcome the alignment problem with fastening devices for securing separable members are found in U.S. Pat. No. 3,695,324 to Gulistan, No. 3,123,120 to Grimm et al, No. 2,986,188 to Karp et al, and No. 2,243,923 to Swanstrom.

SUMMARY AND OBJECTS OF THE INVENTION

Accordingly, it is an object of this invention to provide an improved connector assembly which is essentially self-aligning for removably securing together a pair of interfitting elements.

Another object of this invention is to provide such an improved connector assembly which includes a fastener member loosely, nonrotatably, retainably mounted on one of the elements to accommodate variations in tolerances in the interfitting elements.

Another object of this invention is to provide an improved connector assembly of the character described which further permits limited pivotal and sliding movement of the fastener member relative to the one element for alignment purposes and wherein the fastener member is removably secured to the one element to permit convenient replacement in the event of damage thereto.

Other objects and advantages of the present invention will become more readily apparent upon reference to the accompanying drawings and following description.

BRIEF DESCRIPTION OF THE DRAWINGS

FIG. 1 is a perspective view of a vehicle frame having a guard member secured thereto by a connector assembly embodying the principles of the present invention.

FIG. 2 is a somewhat enlarged longitudinal vertical sectional view with portions in elevation taken generally along the line II—II of FIG. 1.

DESCRIPTION OF THE PREFERRED EMBODIMENT

Figure 3:
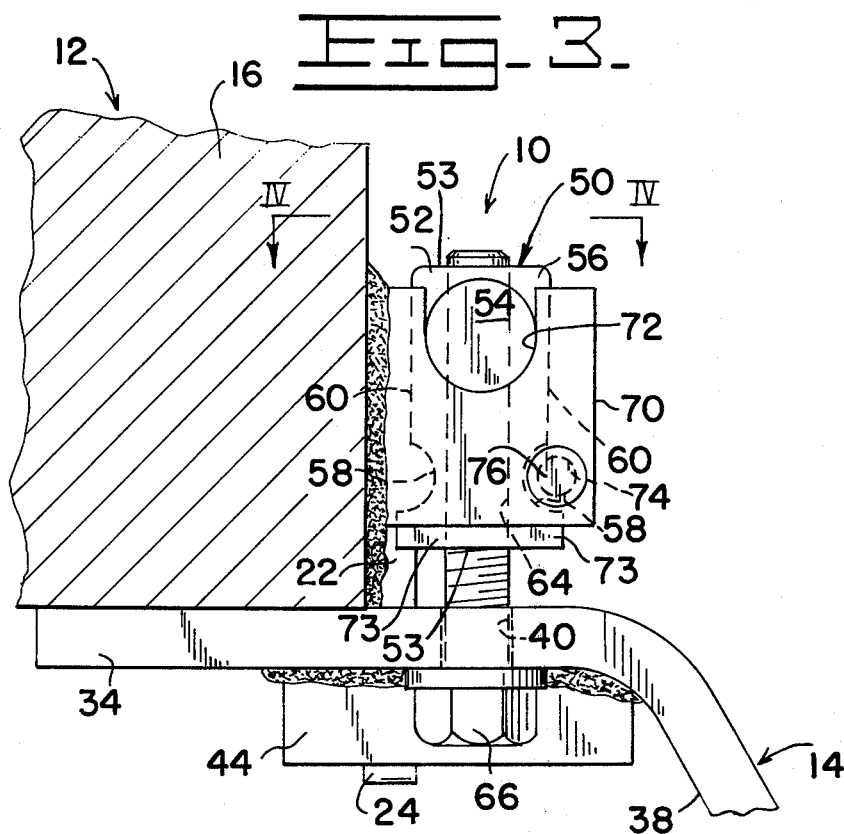
FIG. 3 is a transverse vertical sectional view with portions in elevation taken generally along the line III—III of FIG. 2.
Figure 4:
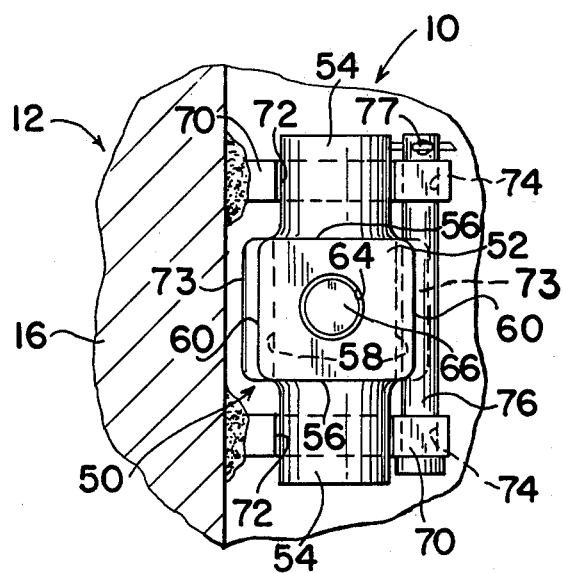
FIG. 4 is a transverse horizontal sectional view with portions in elevation taken generally along the line IV—IV of FIG. 3.

Referring more particularly to the drawings, an improved connector assembly embodying the principles of the present invention is generally indicated by the reference numeral 10 as operatively disposed in connecting relation between a pair of interfitting elements such as a frame 12 and a guard 14. The frame includes a pair of laterally spaced elongated side rails 16 and 18 interconnected at their outer ends by a transversely extending cross member 20 and at a point somewhat rearwardly thereof by a lower cross member 21. A pair of shear blocks 22 and 23 are individually secured by welding in laterally spaced, aligned relation to the inner walls of the frame side rails. Each of the shear blocks include a tapered portion 24 extending below the lower extreme of its respective side rail. The frame 12 is illustrated as a main frame for a vehicle, such as a crawler tractor, which is adapted to support an internal combustion engine, shown in broken lines and indicated generally by the reference numeral 25.

The engine 25 includes an oil pan indicated generally at 26 which is secured to the lower surface thereof for storage of an adequate supply of lubricating fluid for the working components within the engine. Since engine oil pans are generally made from relatively light sheet stock, it is necessary in most earthmoving vehicles to provide guard members beneath the frame to protect the oil pan from damage due to contact with large boulders or stumps during operation of the vehicle. For this purpose, the guard 14 is illustrated as a relatively large belly-type engine guard which is removably secured to the lower portions of the frame side rails 16 and 18 by a plurality of the connector members 10. The guard is a three-sided pan shaped member having a generally horizontally disposed bottom wall 30 bounded by horizontally arranged elevationally spaced front and side mounting flanges 32 and 34, respectively. The bottom wall 30 is integrally interconnected with the front flange 32 by a forwardly and upwardly inclined wall 36 and to the side flanges 34 by outwardly and upwardly angled sidewalls 38.

The side flanges 34 of the guard 12 individually include a plurality of bolt receiving openings 40 as best seen in FIGS. 2 and 3. A generally rectangular tapered opening 41 is provided in each of the side flanges for purposes hereinafter explained. Each of the openings is aligned with a tapered opening 42 formed by a reinforcing block 44 secured by welding in circumscribing relation to the opening 41 to the lower side of each of the side flanges 34. A towing attachment or hook 46 is secured to the front surface of the inclined wall 36 to provide towing capability for the vehicle.

The connector 10 includes a fastener member or connector nut 50 having an elongated generally rectangular body portion 52 having longitudinally spaced opposite ends 53. A pair of oppositely directed support shaft portions or stub shafts 54 are integrally formed at one end of the body extending outwardly from the front and rear faces 56 thereof to define a mounting axis X. The body further includes a pair of semi-cylindrical grooves 58 formed in outwardly opening relation in the inner and outer side surfaces 60 of the body 52. A central vertically disposed threaded bore or securing aperture 64 is provided in the connector nut body for screw threadably receiving a threaded bolt or retainer member 66 which is adapted to extend through the bolt receiving opening 40 in the side flanges 34 of the guard 12. The threaded bore defines a securing axis Y.

Each of the connector nuts 50 is loosely, nonrotatably retainably supported relative to the frame 12 by support bracket means, such as a pair of inwardly extending bracket plates 70. Each of such bracket plates are individually provided with an outwardly semicircular bearing opening recess 72 along their respective upper edges which recesses open away from the side flanges 34 of the guard. Such recesses are adapted rotatably to receive the stub shafts 54 of the connector nut. The recesses are located in the bracket plates so as to provide slight spacing between the adjacent one of a pair of stop flanges 73 of the connector nut and the adjacent frame side rail or nut engaging surface. Each of the pairs of bracket plates 70 includes aligned horizontally extending holes or bores 74 which are disposed in essentially coaxial relation to the outermost one of the semi-cylindrical grooves 58. An elongated lock pin 76 extends through the holes 74 and is secured therein by a cotter pin 77 and is partially received within the outermost groove 58. The groove is formed with a greater diameter than the pin 76 so as to define an annular space therebetween when axially aligned.

OPERATION

During initial assembly, the several pairs of bracket plates 70 are secured to the inner surface of the frame side rails 16 and 18 for support of the connector nuts 50. The connector nuts are then individually installed in an associated pair of the bracket plates by nesting the stub shafts 54 thereof within the recesses 72 so that the body 52 of the connector nut is suspended in pivotal relation between the bracket plates. The provision of a pair of oppositely facing grooves allows installation of the connector nut in either of the two 180° positions in which the stub shafts are engageable with the recesses. The pin 76 is then inserted into the aligned holes 74 for partial receipt within the groove 58. The annular space between the groove and the pin and the space between the nut engaging surface of the frame and the adjacent stop flange 73 permits limited pivotal movement of connector nut between engagement with the pin in one direction and engagement with the nut engaging surface in the other direction to cooperatively define a motion limiting stop mechanism.

Disengagement of the stub shafts 54 from their respective recesses 72 through upward movement of the connector nut is prevented by engagement of the pin 76 with either its respective recess or the adjacent stop flange 73 which continually underlies the pin during the limited pivotal movement of the connector nut so as to cooperatively define a constraining mechanism. The longitudinal spacing of the bracket plates 70 relative to the width of the connector nut body 52 permits limited movement of the nut relative to the bracket by sliding of the stub shafts in the recesses 72.

The guard is then fitted into place below the frame 12 and is horizontally fixedly located with respect thereto by the close fitting receipt of the tapered portions 24 of the shear blocks 22 and 23 in their associated tapered openings 41 and 42 in the side flanges 34 and the reinforcing blocks 44, respectively, as best shown in FIG. 2. Due to the manufacturing tolerances denoted earlier, the bolt receiving openings 40 may not exactly line up with their respective connector nuts 50. This misalignment problem is overcome by the present invention through the ability to individually align each of the connector nuts with its associated bolt receiving opening through the appropriate longitudinal sliding and/or pivotal motion of each of the connector nuts. This permits the insertion of the bolts 66 through their respective bolt receiving openings 40 into screw threaded engagement with the threaded bores 64 of the associated connector nuts. By tightening such bolts, the guard is securely and removably attached to the frame 12.

In addition to locating the guard 14, the shear blocks 22 and 23 are utilized for transferring relatively large horizontal forces exerted on the guard directly to the frame side rails 16 to avoid shearing of the bolts 66. It will be appreciated that such horizontal forces are frequently exerted on the guard in the performance of its protective duties when the vehicle runs over boulders, stumps and the like during operation. Such horizontal forces are transferred through load bearing contact between the tapered portion of the shear blocks and the associated surfaces of the tapered openings 41 and 42 and not through the bolts 66.

It is often necessary to remove the guard 14 for servicing of the engine or related components after extensive periods of field operation. Since the connector assemblies are exposed to the elements and the heads of the bolts 66 are exposed to wear, the threaded connection between the connector nut 52 and the bolt may freeze due to rust or corrosion or the head may become so worn as to preclude wrenching of the bolt therefrom. For these reasons it is often necessary to torch cut the head from the bolts 66 to permit removal of the guard and the subsequent servicing of the machine. Should this occur, with the improved connector assembly 10 the connector nuts 50 may be released by removal of the pin 76 so as to permit their replacement with a new connector nut whereby a new bolt may be engaged therewith upon reassembly of the machine.

It is often necessary to tow a vehicle or for the vehicle to be used in towing some other object by attachment of a tow line to the hook 46 secured to the forward wall 36 of the guard 12. Since such towing can also apply relatively large horizontal loads to the guard, the shear blocks are further utilized to transfer such loading directly to the frame in the manner previously described.

In view of the foregoing, it is readily apparent that the structure of the present invention provides an improved connector assembly for removably securing together a pair of interfitting members such as a guard to a frame which includes a connector nut loosely, nonrotatably, retainably mounted on the frame in substantially self-aligning relation thereto to accommodate variations in tolerances. Such mounting permits limited pivotal and sliding movement of the connector nut relative to the frame. This allows the connector nut to be precisely aligned with securing bolts which are screw threadably received therein. The connector nut is further releasably secured to the frame so as to permit its convenient and ready replacement should it become damaged or unremovably frozen on the bolt.

While the invention has been described and shown with particular reference to the preferred embodiment, it will be apparent that variations might be possible that would fall within the scope of the present invention which is not intended to be limited except as defined in the following claims.

What is claimed is:

1. An improved connector assembly, for removably securing a member having a bolt receiving opening therethrough to a frame, which frame has a wall disposed in radially spaced, substantially parallel relation to such bolt receiving opening, comprising;

support bracket means secured to such wall of said frame and providing a pair of laterally spaced bracket plates disposed on opposite sides of said opening and having a pair of aligned, semicircular bearing recesses disposed axially normal to said opening and opening away therefrom;

a connector nut having a threaded bore therethrough and a pair of oppositely extending stub shafts disposed along a mounting axis normal to said bore, said stub shafts being adapted for cradling receipt within said bearing recesses of said bracket plates so as to loosely mount said connector nut in spaced relation from said member and said wall of said frame to allow pivotal movement about and limited sliding movement along said mounting axis between said bracket plates to permit the precise alignment of said threaded bore of said connector nut with said bolt receiving opening of said member;

flange means carried on said connector nut; and pin means detachably mountable to said bracket means for cooperative engagement with said flange means for selectively retaining said stub shafts of said connector nuts in torque transmitting engagement within their respective bearing recesses to constrain rotary movement of said connector nut about its threaded bore when such pin means are mounted to said bracket means, and for permitting selective removal of said connector nut for replacement purposes when said pin means are dismounted therefrom.

2. The improved connector assembly of claim 1 wherein said connector nut includes;

an elongated body having longitudinally spaced opposite ends normal to said threaded bore and a pair of opposite sides parallel with said bore and normal to said stub shafts, with said stub shafts being disposed at one end of said body and said flange means being disposed at the other end thereof and including at least one flange portion extending outwardly from one of said opposite sides;

said pin means includes an elongated pin having opposite ends; and said bracket means includes a pair of aligned bores individually formed in said bracket plates which bores are adapted for loosely receiving the opposite ends of said pin and located so as to position said pin in slightly spaced relation above said flange portion for constraining engagement therewith and normally in offsetting relation to said one side of said body for limiting pivotal movement of said connector nut about its mounting axis.

3. The improved connector assembly of claim 2 including means for removably securing said pin within said aligned bores.

4. The improved connector assembly of claim 3 wherein said flange means includes;

another flange portion extending outwardly from the other of said opposite sides of said body of the connector nut; and means providing a nut engaging surface parallel to said other side and normally in offsetting relation to said other flange portion to limit pivotal movement of said connector nut so that said one flange portion continuously underlies said pin throughout the entire pivotal movement of said connector nut as cooperatively permitted by said nut engaging surface and said pin means.

5. The improved connector assembly of claim 4 wherein said connector nut is provided with an outwardly opening semi-cylindrical groove in said one side axially along said pin so as to increase the amount of pivotal movement allowed said connector nut without undue extension of its flange portion to provide said connector assembly with greater compactness.

6. The improved connector assembly of claim 5 wherein said connector nut is provided with a similar outwardly opening semi-cylindrical groove along its other side and wherein said flange portions are identical so that said connector nut can be operatively reversibly installed within said bracket means.

* * * * *